Figure 6:
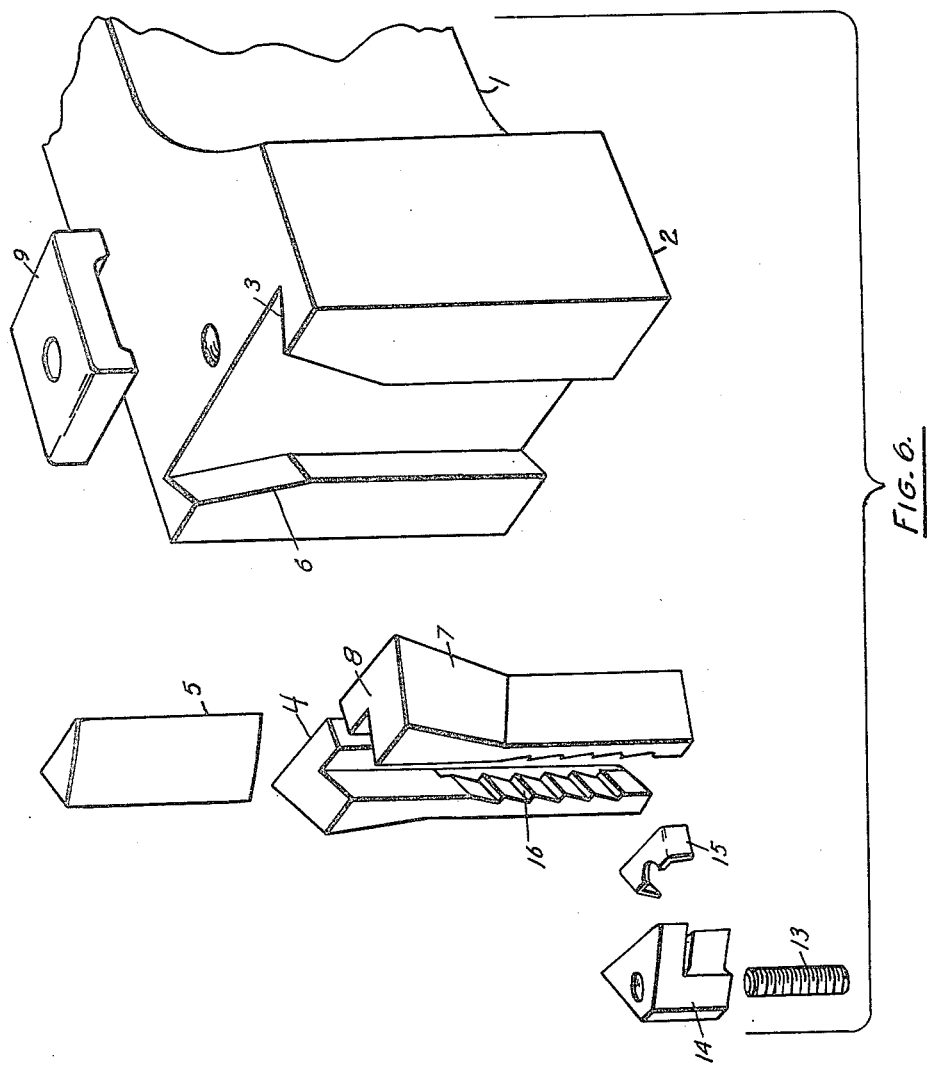

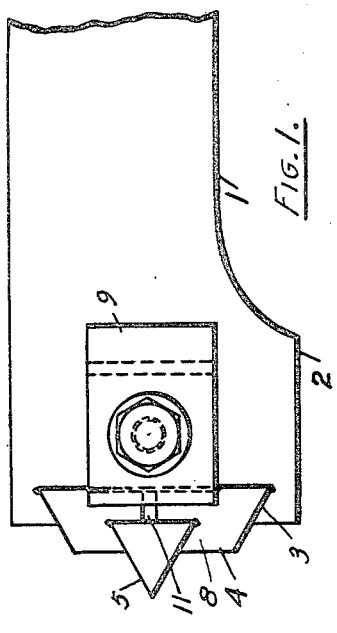
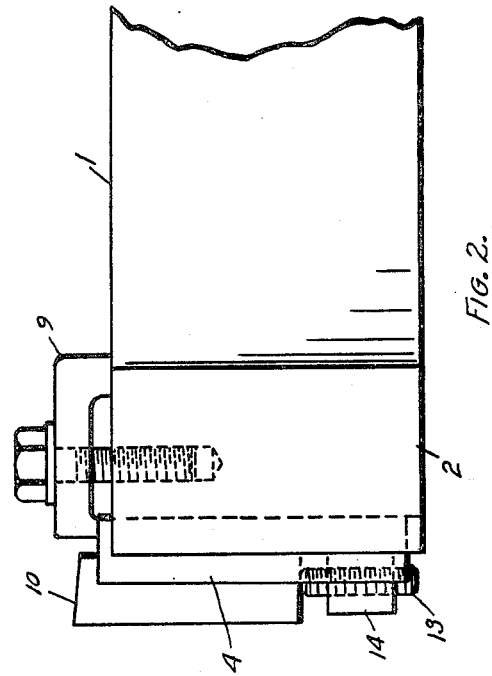
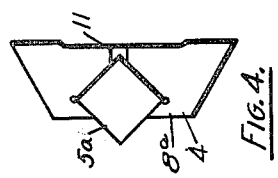
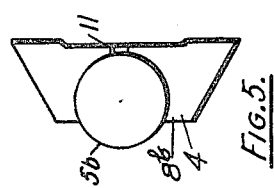
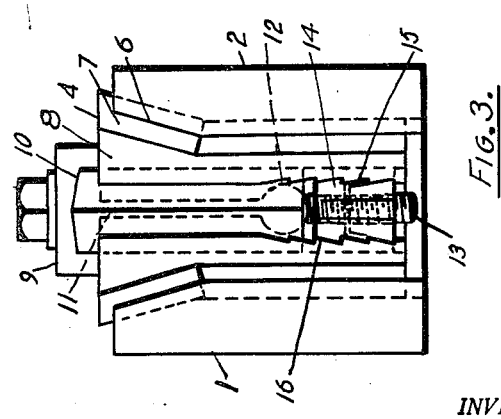
INVENTOR.
BY Walter J Greenleaf
Ralph Hammar
Attorney Oct. 5, 1954  W. J. GREENLEAF  2,690,609
CUTTING TOOL
Filed March 27, 1952  2 Sheets-Sheet 2

INVENTOR.
BY Walter J Greenleaf
Ralph Hauman
Attorney

Patented Oct. 5, 1954

2,690,609

UNITED STATES PATENT OFFICE 2,690,609

CUTTING TOOL

Walter J. Greenleaf, Meadville, Pa.

Application March 27, 1952, Serial No. 278,761

4 Claims. (Cl. 29—96)

Cutting tools have been made with a holder bored or recessed to receive an inserted bit of cemented carbide which has cutting edges on the exposed end surface of the bit and has the unused portion of the bit adjustably received in the bore. Such tools require precision machining of the bore or bit receiving recess and a relatively large part of the bit must remain in the bore to provide adequate support for the cutting thrusts. This limits the portion of the bit which can be used.

This invention is intended to increase the useful life of the tool bits by mounting the bits in an auxiliary holder which seats in a bore or recess in the main holder and has clutch jaws adjacent the cutting surface of the bit which are wedged into gripping relation with the bit as the auxiliary holder is seated in the main holder. The clutch jaws provide the desired firm support for the tool bit where it is most effective—namely, adjacent the cutting edges.

In the drawings, Fig. 1 is a top plan of a tool; Fig. 2 is a side view; Fig. 3 is an end view; Figs. 4 and 5 are top views of other shaped bits; and Fig. 6 is an exploded perspective of the Figs. 1–3 tool.

The invention is shown applied to a tool having a main holder 1 with a head 2 provided with dovetail grooves 3 in which is seated an auxiliary holder 4 for a bit 5. The bits are made in a variety of shapes (triangular, Fig. 1; square, Fig. 4; and round, Fig. 5), but the main holder will accommodate all auxiliary holders 4 having the same outside dimensions regardless of the shape of bit the auxiliary holders are designed to receive.

At the upper ends, the dovetail grooves 3 have diverging outwardly inclined tapered sections 6 which cooperate with correspondingly tapered sections 7 on split clutch jaws 8 on the auxiliary holder. As the auxiliary holder is forced downward, for example by a clamp 9, the sections 6 cooperate with the sections 7 and wedge or force the jaws 8 toward each other to grip the bit 5 therebetween. The gripping force of the jaws 8 is closely adjacent the upper end 10 of the bit which serves as the cutting edge. This provides the necessary firm support for the bit.

As shown more clearly in Fig. 3, the jaws 8 are spring jaws, normally spread apart by their inherent resistance like a collet, the spring action being permitted by a slot 11 which terminates in a round hole 12 which prevents localized stress as the jaws 8 flex toward and away from each other.

Fine adjustment of the bit is provided by a set screw 13 threaded in a ratchet block 14. Loosening the clamp 9 relaxes the grip of the jaws 8 so the bit can slide in the jaws to the position determined by the adjustment of the set screw. Coarse adjustment of the bit is provided by the ratchet block 14 which has a spring pawl or dog 15 cooperating with ratchet teeth 16 on the inner surface of one of the dovetail grooves 3. When the grip of the jaws 8 is relaxed, the block 14 can be pushed upward thereby opening a new range of adjustment for the set screw 13.

The auxiliary holders 4 shown in Figs. 4 and 5 have the same outside dimensions and accordingly are usable interchangeably in the main holder. The essential difference is in the shape of the jaws which grip the bit. For the square bit 5a, the jaws 8a straddle the diametrically opposite corners of the bit. For the round bit 5b, the jaws 8b extend past the center of the bit. Whatever the shape of the bit, the jaws are shaped to fit the bit and in the gripping position, the parts of the gripping surfaces of the jaws converge toward each other so as to prevent outward movement of the bit away from the head of the main holder.

What is claimed as new is:

1. In a cutting tool, a tool holder having a head portion with spaced dovetail grooves therein extending transverse to the head portion in the direction of the cutting thrust and with outwardly inclined surfaces at the upper ends of the grooves, the portion of said holder having the grooves therein being rigid, an auxiliary tool holder suitably received in the grooves and having at its upper end spaced spring jaws provided with complementary outwardly tapering surfaces cooperating with the inclined surfaces on the grooves to wedge the jaws toward each other as the auxiliary holder is forced downward in the grooves, opposed seats in the jaws likewise extending transverse to the head portion in the direction of the cutting thrust and slidably receiving a bit therebetween when the jaws are relaxed and gripping the bit when the jaws are moved together, a bit in said seats extending endwise into said opposed seats and having a cutting edge on the end of the bit adjacent the upper end of the dovetail grooves arranged so the cutting thrusts are largely transmitted endwise of the bit, and means forcing the auxiliary holder downward in the grooves to wedge the jaws together and grip the bit.

2. In a cutting tool, a tool holder having a head portion with a guide way therein extending transverse to the head portion in the direction of the cutting thrusts, the portion of said holder having the guideway therein being rigid, an auxiliary tool holder slidably received in the guide way and having at its upper end opposed spring jaws, surfaces on the main and auxiliary holders cooperating to wedge the jaws toward each other as the auxiliary holder is forced downward in the guide way, opposed seats in the jaws likewise extending endwise to the head portion in the direction of the cutting thrusts and slidably receiving a bit therebetween when the jaws are relaxed and gripping the bit when the jaws are forced together, a bit in said seats extending endwise into said opposed seats and having a cutting edge adjacent the upper end of said guideway arranged so the cutting thrusts are largely transmitted endwise of the bit, and means forcing the auxiliary holder downward in the guide way to wedge the jaws together and grip the bit.

3. In a cutting tool, a tool holder having a head portion with a guide way therein extending transverse to the head portion in the direction of the cutting thrusts, the portion of said holder having the guideway therein being rigid, an auxiliary tool holder slidably received in the guide way and having at its upper end spaced collet jaws likewise extending transverse to the head portion in the direction of the cutting thrusts, complementary surfaces on the main and auxiliary tool holders cooperating to wedge the collet jaws toward each other as the auxiliary holder is moved along the guide way, opposed seats in the collet jaws slidably receiving a bit therebetween when the jaws are relaxed and gripping the bit when the jaws are forced toward each other, a bit in said seats extending endwise into said opposed seats and having a cutting edge adjacent the upper end of said guideway arranged so the cutting thrusts are largely transmitted endwise of the bit, and means forcing the auxiliary holder along the guide way in the direction to bring the complementary surfaces into engagement to wedge the jaws together and grip the bit.

4. In a cutting tool, a tool holder having a head portion with spaced dovetail grooves therein extending transverse to the head portion in the direction of the cutting thrust and with outwardly inclined surfaces at the upper ends of the grooves, the portion of said holder having the grooves therein being rigid, an auxiliary tool holder slidably received in the grooves and having at its upper end spaced spring jaws provided with complementary outwardly tapering surfaces cooperating with the inclined surfaces on the grooves to wedge the jaws toward each other as the auxiliary holder is forced downward in the grooves, opposed seats in the jaws likewise extending transverse to the head portion in the direction of the cutting thrust and slidably receiving a bit therebetween when the jaws are relaxed whereby the bit can be adjusted to advance the bit to compensate for wear, a bit in said seats extending endwise into said opposed seats and having a cutting edge on the end of the bit adjacent the upper end of the dovetail grooves arranged so the cutting thrusts are largely transmitted endwise of the bit, an abutment carried by the auxiliary holder for engaging the end of the bit within the auxiliary holder, and means forcing the auxiliary holder downward in the grooves to wedge the jaws together and grip the bit.

References Cited in the file of this patent

UNITED STATES PATENTS

| Number | Name | Date |
|---|---|---|
| 693,974 | Koeller et al. | Feb. 25, 1902 |
| 770,273 | Dyer | Sept. 20, 1904 |
| 2,550,949 | Weidner | May 1, 1951 |

FOREIGN PATENTS

| Number | Country | Date |
|---|---|---|
| 48,193 | Sweden | Dec. 22, 1920 |
| 309,869 | Germany | Dec. 20, 1918 |
| 657,995 | Germany | Mar. 18, 1938 |